US007839551B2

(12) United States Patent
Lee et al.

(10) Patent No.: US 7,839,551 B2
(45) Date of Patent: Nov. 23, 2010

(54) HOLOGRAPHIC MICROSCOPY OF HOLOGRAPHICALLY TRAPPED THREE-DIMENSIONAL STRUCTURES

(75) Inventors: Sang-Hyuk Lee, Albany, CA (US); David G. Grier, New York, NY (US)

(73) Assignee: New York University, New York, NY (US)

( * ) Notice: Subject to any disclaimer, the term of this patent is extended or adjusted under 35 U.S.C. 154(b) by 371 days.

(21) Appl. No.: 12/020,376

(22) Filed: Jan. 25, 2008

(65) Prior Publication Data

US 2009/0027747 A1 Jan. 29, 2009

Related U.S. Application Data

(60) Provisional application No. 60/897,784, filed on Jan. 26, 2007.

(51) Int. Cl.
*G02B 5/32* (2006.01)
(52) U.S. Cl. .................. 359/15; 359/368; 359/385; 359/577; 359/902
(58) Field of Classification Search ............ 359/15, 359/368, 385, 577, 902
See application file for complete search history.

(56) References Cited

U.S. PATENT DOCUMENTS

| 6,624,940 | B1 * | 9/2003 | Grier et al. | 359/566 |
|---|---|---|---|---|
| 7,133,203 | B2 * | 11/2006 | Grier et al. | 359/566 |
| 7,233,423 | B2 * | 6/2007 | Grier | 359/15 |
| 7,473,890 | B2 * | 1/2009 | Grier et al. | 250/251 |
| 2003/0021016 | A1 * | 1/2003 | Grier | 359/368 |
| 2004/0156098 | A1 * | 8/2004 | Dubois et al. | 359/368 |
| 2008/0285099 | A1 * | 11/2008 | Knutson et al. | 359/15 |
| 2009/0073563 | A1 * | 3/2009 | Betzig | 359/578 |
| 2009/0135432 | A1 * | 5/2009 | Betzig | 356/521 |

OTHER PUBLICATIONS

Denis et al., "Direct Extraction of the mean Particle Size from a Digital Hologram", *Applied Optics*, Feb. 10, 2006, pp. 944-952, vol. 45, No. 5, Optical Society of America.

Guerrero-Viramontes et al., "3D Particle Positioning from CCD Images Using the Generalized Lorenz-Mie and Huygens-Fresnel Theories", *Meas. Sci. Technol.*, 2006, pp. 2328-2334, vol. 17, IOP Publishing Ltd., United Kingdom.

Knöner, et al., "Measurement of the Index of Refraction of Single Microparticles", *Physical Review Letters*, 2006, pp. 157402-1-157402-4, vol. 97, The American Physical Society.

Moreno et al., "Particle Positioning from Charge-Coupled Device Images by the Generalized Lorenz-Mie Theory and Comparison with Experiement", *Applied Optics*, Oct. 1, 2000, pp. 5117-5124, vol. 39, No. 28, Optical Society of America.

(Continued)

*Primary Examiner*—Frank G Font
(74) *Attorney, Agent, or Firm*—Foley & Lardner LLP

(57) ABSTRACT

A method and system for performing three-dimensional holographic microscopy of an optically trapped structure. The method and system use an inverted optical microscope, a laser source which generates a trapping laser beam wherein the laser beam is focused by an objective lens into a plurality of optical traps. The method and system also use a collimated laser at an imaging wavelength to illuminate the structure created by the optical traps. Imaging light scattered by the optically tapped structure forms holograms that are imaged by a video camera and analyzed by optical formalisms to determine light field to reconstruct 3-D images for analysis and evaluation.

21 Claims, 5 Drawing Sheets

OTHER PUBLICATIONS

Park et al., "Fresnel Particle Tracing in Three Dimensions Using Diffraction Phase Microscopy", *Optics Letters*, Apr. 1, 2007, pp. 811-813, vol. 32, No. 7, Optical Society of America.

Pu et al., "Particle Field Characterization by Digital In-Line Holography: 3D Location and Sizing" *Experiments in Fluids*, 2005, pp. 1-9, vol. 39, Springer-Verlag.

Ray et al., "Precision of Light Scattering Techniques for Measuring Optical Parameters of Microspheres", *Applied Optics*, Sep. 20, 1991, pp. 3974-3983, vol. 30, No. 27, Optical Society of America.

Sheng et al., "Digital Holographic Microscope for Measuring Three-Dimensional Particle Distributions and Motions", *Applied Optics* Jun. 1, 2006, pp. 3893-3901, vol. 45, No. 16, Optical Society of America.

Soulez et al., "Inverse Problem Approach in Particle Digital Holography: Out-of-Field Particle Detection Made Possible", Dec. 2007, pp. 3708-3716, vol. 24, No. 12, Optical Society of America.

Soulez et al., "Inverse-Problem Approach for Particle Digital Holography: Accurate Location Based on Local Optimization", Apr. 2007, pp. 1164-1171, vol. 24, No. 4, Optical Society of America.

Thompson, B. J., "Holographic Particle Sizing Techniques", *Journal of Physics E: Scientific Instruments*, 1974, pp. 781-788, vol. 7, Great Britain.

Pralle, et al., "Three-Dimensional High-Resolution Particle Tracking for Optical Tweezers by Forward Scattered Light", *Microscopy Research and Technique*, 1999, pp. 378-386, vol. 44, Wiley-Liss, Inc.

Huang et al., "Optical Tweezers as Sub-Pico-Newton Force Transducers", *Optics Communication*, Aug. 1, 2001, pp. 41-48, vol. 195, Elsevier Science B.V.

Neuman et al., "Optical Trapping", *Review of Scientific Instruments*, Sep. 2004, pp. 2787-2809, vol. 75, No. 9, American Institute of Physics.

Zhang et al., "Reconstruction Algorithm for High-Numerical-Aperture Holograms with Diffraction-Limited Resolution", *Optics Letters*, Jun. 1, 2006, pp. 1633-1635, vol. 31, No. 11, Optical Society of America.

Lee et al., "Holographic Microscopy of Holographically Trapped Three-Dimensional Structures", *Optics Express*, Feb. 19, 2007, pp. 1505-1512, vol. 15, No. 4, Optical Society of America.

* cited by examiner

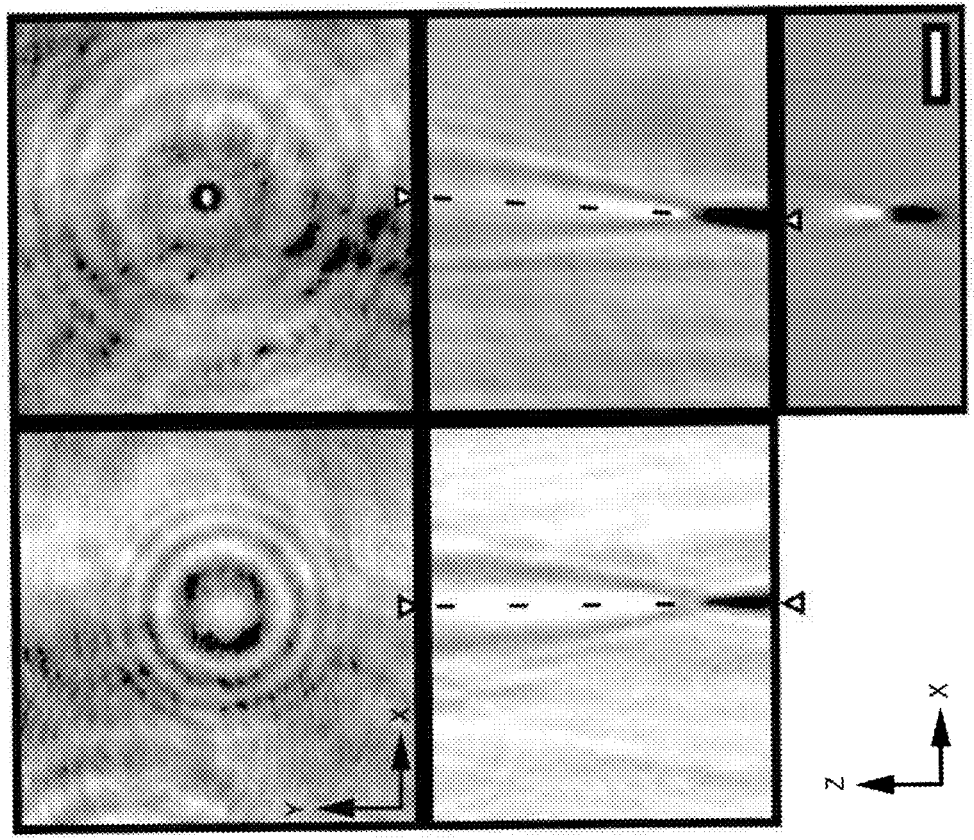

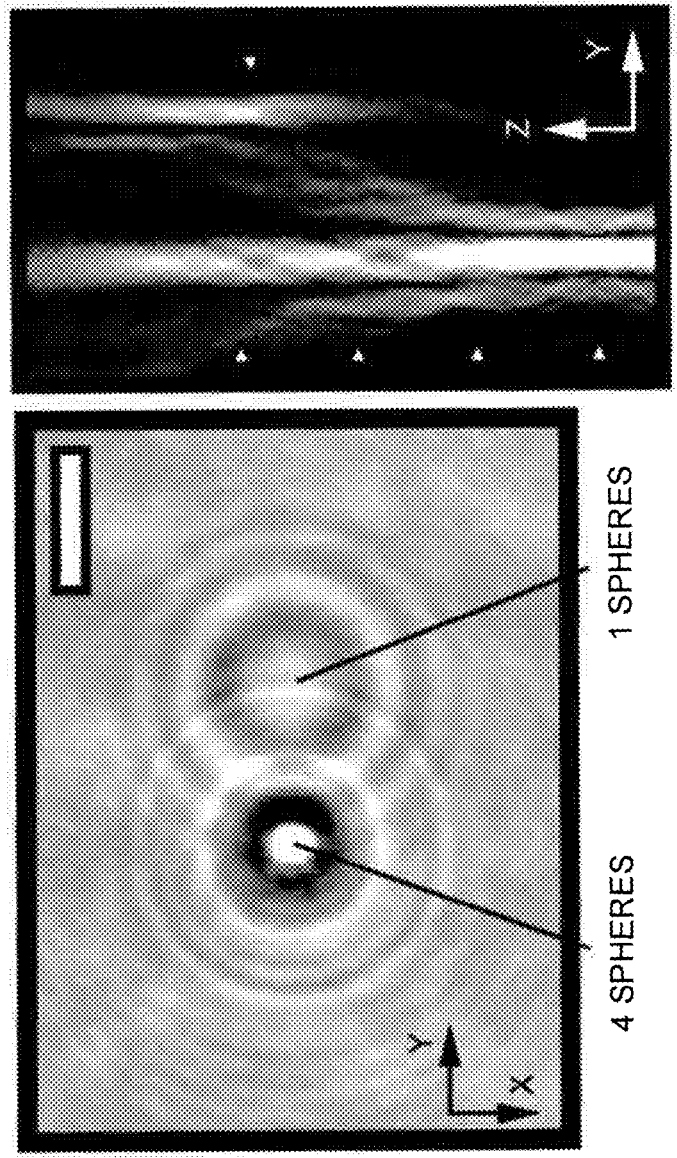

US 7,839,551 B2

HOLOGRAPHIC MICROSCOPY OF HOLOGRAPHICALLY TRAPPED THREE-DIMENSIONAL STRUCTURES

CROSS REFERENCE TO RELATED PATENT APPLICATIONS

This application claims the benefit under 35 U.S.C. 119(e) of U.S. Application 60/897,784 filed Jan. 26, 2007, incorporated by reference herein in its entirety.

The U.S. Government has certain rights in this invention pursuant to grants from the National Science Foundation through Grant Number DBI-0629584 and Grant Number DMR-0606415.

This invention is directed to a holographic optical trapping system using optical traps generated by computer-established holograms to organize materials and apply microscope optics to inspect and analyze the materials in three dimensions (3-D). More particularly, a holographic video microscope system uses real-time resolved volumetric images of 3-D microstructures to carry out analysis and inspection of material assemblies.

BACKGROUND OF THE INVENTION

Holographic optical trapping uses computer-generated holograms to trap and organize micrometer-scale objects into arbitrary three-dimensional configurations. No complementary method has been available in the prior art for examining optically trapped structures except for conventional two-dimensional microscopy. Three-dimensional imaging would be useful for a variety of uses, such as verifying the structure of holographically organized systems before fixing them in place. It also would be useful for interactively manipulating and inspecting three-dimensionally structured objects such as biological specimens. Integrating three-dimensional imaging with holographic trapping might seem straightforward because both techniques can make use of the same objective lens to collect and project laser light, respectively. However, conventional three-dimensional imaging methods, such as confocal microscopy, involve mechanically translating the focal plane through the sample. Holographic traps, however, are positioned relative to the focal plane, and would move as well. The trapping pattern would have to be translated to compensate for the microscope's mechanical motion, which would add substantial complexity, would greatly reduce imaging speed, and would likely disrupt the sample undergoing examination and analysis.

SUMMARY OF THE INVENTION

Digital holographic microscopy solves all of the prior art technical problems, providing real-time three-dimensional (3-D) imaging data without requiring any mechanical motion, including no need to translate the focal plane through the sample under analysis. A particularly compatible variant of in-line holographic microscopy replaces the conventional illuminator in a bright-field microscope with a collimated laser. Light scattered out of the laser beam by the object interferes with the remainder of the incident illumination to produce a heterodyne scattering pattern that is magnified by the objective lens and recorded with a video camera. This scattering pattern is a hologram of the trapped structure. Provided that this interference pattern is not obscured by multiple light scattering, it contains comprehensive information on the scatterers' three-dimensional configuration. Each two-dimensional snapshot in the resulting video stream encodes time-resolved volumetric information that can be analyzed directly, or decoded numerically into three-dimensional representations. This system and method enables ready commercial use of digital holographic microscopy in a holographic optical manipulation system, and uses the combined capabilities to directly assess both techniques' accuracy and establish any limitations.

Various detailed aspects of the invention are described hereinafter, and these and other improvements and features of the invention are described in detail hereinafter, including the drawings described in the following section.

BRIEF DESCRIPTION OF THE DRAWINGS

FIG. 3A illustrates a hologram recorded in an xy plane of a single sphere trapped at x=17 micrometers above a focal plane; FIG. 3B illustrates the real part of the scattered field reconstructed from FIG. 3A; FIG. 3C shows a hologram recorded with the sphere at x=0; FIG. 3D shows an axial section of the scattered field obtained by translating the subject colloidal sphere past the focal plane in $\Delta_z$=0.122 μm micrometer steps; FIG. 3E shows an equivalent reconstruction using conventional illumination; FIG. 4A shows resolution limits for occluded objects in the xy plane and FIG. 4B for the zy plane.

DETAILED DESCRIPTION OF PREFERRED EMBODIMENTS

Figure 1:
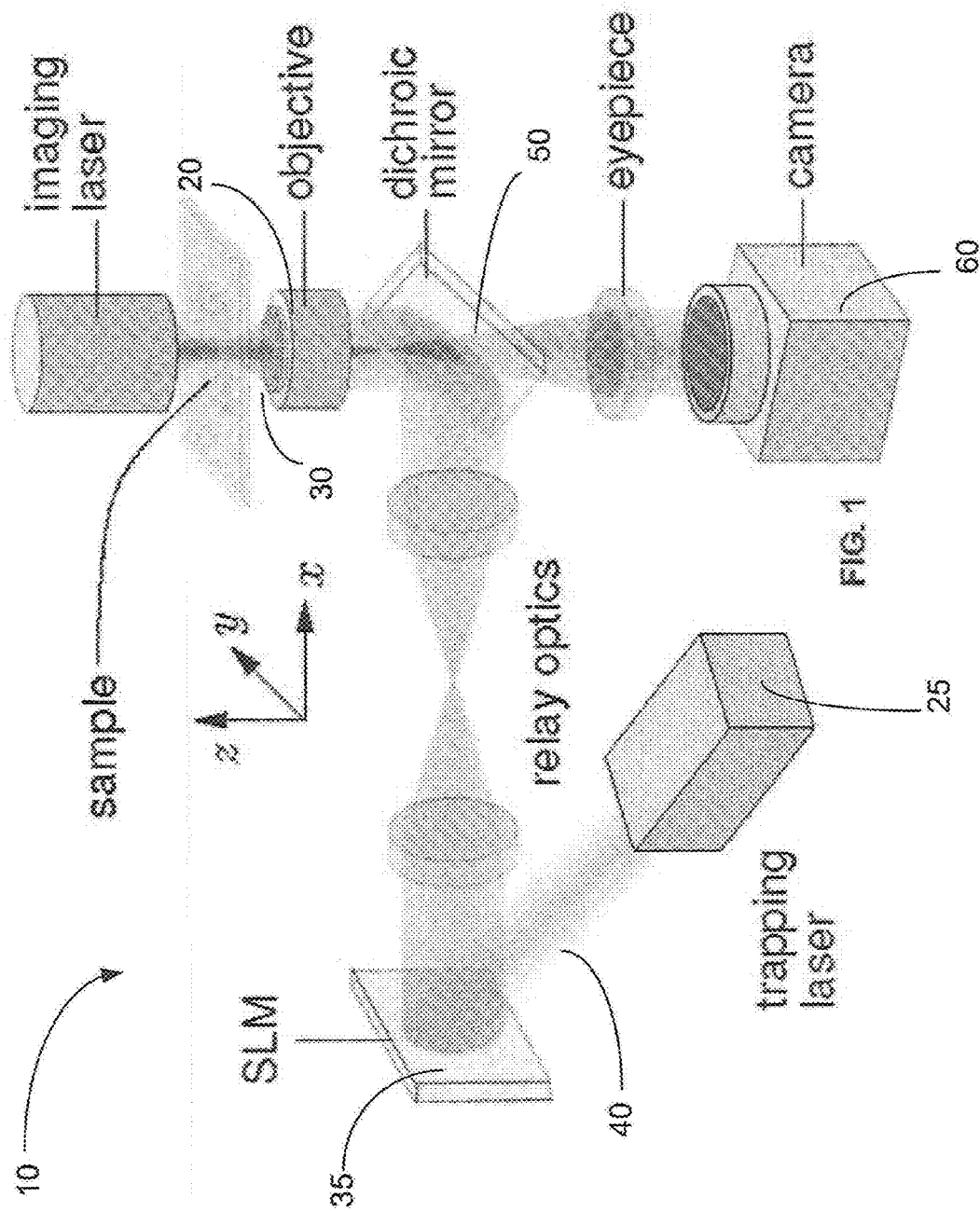
FIG. 1 illustrates a system constructed in accordance with the invention.

FIG. 1 shows a schematic representation of an integrated system 10 constructed in accordance with the invention. The system 10 is based on an inverted optical microscope (such as, Zeiss Axiovert S100-TV) outfitted with a 100× NA 1.4 oil immersion objective lens 20. This lens 20 is used both to project holographic optical traps, and also to collect in-line holographic images of trapped objects. Holographic traps are preferably powered by a frequency-doubled diode-pumped solid state laser 25 (such as, a Coherent Verdi) operating at a wavelength of 532 nm to generate input laser beam 30. A liquid crystal spatial light modulator 35 (such as a Hamamatsu PAL-SLM X7550) imprints the beam's wavefronts with phase-only holograms encoding the desired trapping pattern. The modified trapping beam 40 then is relayed to the input pupil of the objective lens 20 and is focused into optical traps.

The trapping beam 40 is preferably relayed to the objective lens 20 with a dichroic mirror 50 tuned to the trapping laser's wavelength. Other wavelengths pass through the dichroic mirror 50 and form images on a CCD camera 60 (such as, NEC TI-324AII). In a most preferred embodiment a standard combination of incandescent illuminator and condenser lens 62 has been replaced with a helium-neon laser providing 5 mW collimated beam of coherent light at a wavelength of λ=632 nm in air. The system 10 further includes a computer 65 for manipulation of sensed image data and analyzing the image data by executing calculations of all equations provided herein by conventional software known in the art. The computer 65 can also include any conventional executable memory, such as a ROM, RAM, or other well known memory capable of storing a program, data or other instructions which can be executed to fulfill the analyzation functions described herein.

Figure 2C:
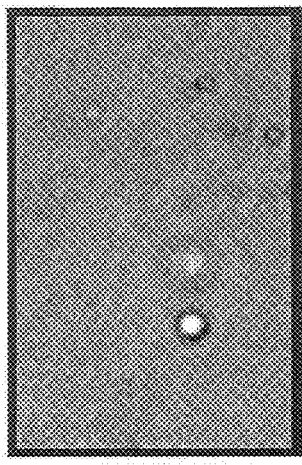
FIG. 2C illustrates a bright-field image of the rotated pattern of FIG. 2B as seen in the xy plane.
Figure 2D:
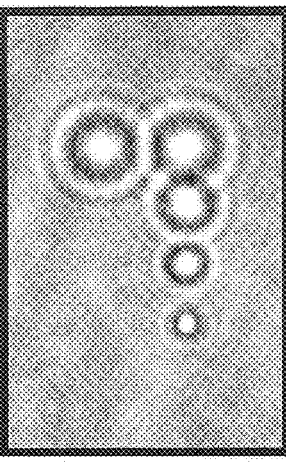
FIG. 2D illustrates a coherent image of the same structure as seen in the xy plane.
Figure 2E:
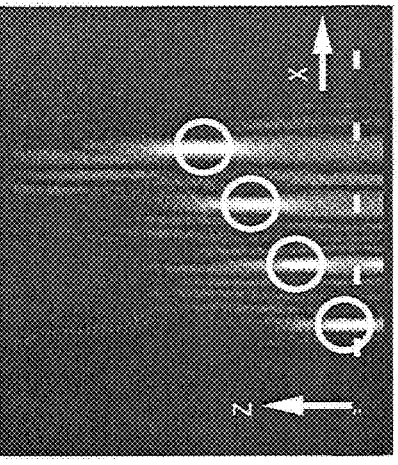
FIG. 2E illustrates a holographic reconstruction of an xz slice through the tilted pattern (circles denote the intended particle coordinates)
Figure 2A:
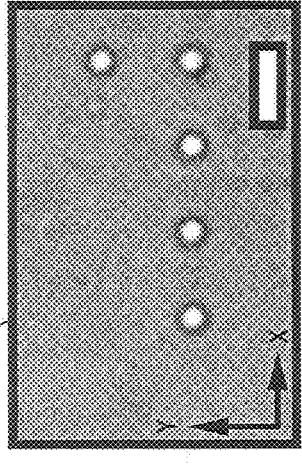
FIG. 2A illustrates a conventional bright-field image of five colloidal spheres trapped in an xy plane (the scale bar is 5 micrometers)
Figure 2B:
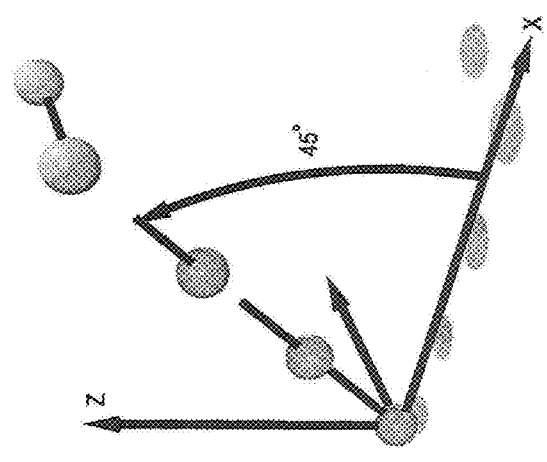
FIG. 2B illustrates the pattern of FIG. 2A rotated about a y axis by 45°.

FIG. 2A demonstrates holographic imaging of colloidal spheres 70 holographically trapped in a three-dimensional pattern. These 1.53 μm diameter silica spheres 70 (Bangs Labs Lot No. L011031B) are dispersed in a 50 μm thick layer of water confined within a slit pore formed by sealing the edges of a #1.5 cover slip to the surface of a clean glass microscope slide. Each of the spheres 70 is trapped in a separate point-like optical tweezer, and the individual optical traps are positioned independently in three dimensions. FIG. 2A shows a conventional bright-field image of the sphere or the particles 70 arranged in a focal plane. Projecting a sequence of holograms with the trapping positions slightly displaced enables us to rotate the entire pattern in three dimensions, as shown in FIG. 2B. As the particles 70 move away from the focal plane, their images blur, as can be seen in FIG. 2C. It is difficult to determine from this image whether the most distant particles 70 are present at all.

FIG. 2D shows the same field of view, but with laser illumination. Each of the particles 70 appears in this image as the coherent superposition of the laser light it scatters with the undiffracted portion of the input laser beam 30. Other features in the image result from reflections, refraction and scattering by surfaces in the optical train of the system 10. These can be minimized by subtracting off a reference image obtained with no particles or trapped structure in the field of view.

Enough information is encoded in two-dimensional real-valued images such as FIGS. 2A-2E to at least approximately reconstruct the three-dimensional complex-valued light field. The image in FIG. 2E is an example showing a numerically reconstructed vertical cross-section through the array of particles 70. This demonstrates the feasibility of combining holographic microscopy with holographic optical trapping. The reconstruction is consistent with the anticipated 45° inclination of the array, and with the calibrated 5.9 μm separation between the particles 70. Intended particle coordinates are shown as circles superimposed on the image. This quantitative comparison demonstrates the utility of holographic microscopy for verifying holographic assemblies. Because holographic images, such as FIG. 2D, can be obtained at the full frame rate of the video camera 60, holographic microscopy offers the benefit of real-time data acquisition over confocal and deconvolution microscopies.

In a most preferred embodiment, very accurate results can be obtained from use of the Rayleigh-Sommerfield formalism because holograms, such as in FIG. 2D form at ranges comparable to the light wavelength. The field $u(r, z)$ scattered by an object at height z above the microscope's focal plane propagates to the focal plane, where it interferes with the reference field, $a(r)$, comprised of the undiffracted portion of the laser illumination. The Rayleigh-Sommerfield propagator describing the object field's propagation along optical axis 80 is:

$$h_z(r) = -\frac{1}{2\pi} \frac{\partial}{\partial z} \frac{e^{ikR}}{R}, \quad (1)$$

where $R^2 = r^2 + z^2$ and $k = 2\pi n/\lambda$ is the light's wavenumber in a medium of refractive index n. The field in the focal plane is the convolution $u(r,0) \otimes h_z(r)$. The observed interference pattern, therefore, is $$I(r) = |a(r)|^2 + 2\Re\{a^*(u \otimes h_z)\} + |u \otimes h_z|^2 \quad (2)$$

The first term in Eq. (2) can be approximated by measuring the intensity when no objects are in the field of view. FIG. 2D was obtained by subtracting such a reference image from the measured interference pattern. If we further assume that the scattered field is much dimmer than the reference field, the second term in Eq. (2) dominates the third. In that case, $$b(r) = \frac{I_0(r) - |a(r)|^2}{|a(r)|} \approx 2\frac{\Re\{a*(u \otimes h_z)\}}{|a(r)|} \quad (3)$$

$$\approx 2\Re\{u \otimes h_z\} \quad (4)$$

provides a reasonable basis for reconstructing $u(r)$. Ghosting can be minimized by translating trapped structures away from the focal plane.

Analyzing Eq. (3) can be simplified by assuming $a(r)=1$ for the reference field. In our application, however, the illuminating laser trapping beam 40 passes through an inhomogeneous sample before reaching the focal plane. Any resulting amplitude variations can be eliminated by normalizing $I(r)$ with $|a(r)|$. Structure in the illumination's phase cannot be compensated in this way, and must be assumed to vary more gradually than any features of interest.

Reconstructing the three-dimensional intensity field is most easily performed using the Fourier convolution theorem, according to which $$B(q) \equiv \int_{-\infty}^{\infty} b(r)\exp(-iq \cdot r)d^2r \quad (5)$$

$$\approx U(q)H_z(q) + U^*(q)H_z^*(q), \quad (6)$$

where $U(q)$ is the Fourier transform of $u(r, 0)$ and $$H_z(q) = \exp\left(ikz\left[1 - \frac{\lambda q^2}{2\pi n}\right]^{\frac{1}{2}}\right) \quad (7)$$

is the Fourier transform of the Rayleigh-Sommerfield propagator.

The estimate for the Fourier transform of the object field at height z' above the focal plane is obtained by applying the appropriate Rayleigh-Sommerfield propagator to translate the effective focal plane:

$$B(q)H_{-z'}(q) \approx U(q)H_{z-z'}(q) + U^*(q)H_{-z-z'}(q) \quad (8)$$

The first term in Eq. (8) is the reconstructed field, which comes into best focus when z'=z. The second is an artifact that is increasingly blurred as z' increases. Unfortunately, this term creates a mirror image around the plane z=0 with the result that objects below the focal plane cannot be distinguished from objects above. This ghosting is apparent in FIG. 2E.

Our final estimate for the complex light field at height z above the focal plane is $$v(r, z) \equiv |v(r, z)|\exp(i\phi(r, z)) \quad (9)$$

$$= \frac{1}{4\pi^2}\int_{-\infty}^{\infty} B(q)H_{-z}(q)\exp(iq \cdot r)d^2q \quad (10)$$

Equation (9) can reconstruct a volumetric representation of the instantaneous light field in the sample under inspection from a single holographic snapshot, I(r). The image in FIG. 2E is a cross-section through the reconstructed intensity distribution, $|v(r,z)|^2$.

Each sphere in FIG. 2E appears as a bright axial streak centered on a relatively dark dimple at the object's three-dimensional position. Circles superimposed on FIG. 2E denote the intended three-dimensional positions of the spheres 70, which were used to compute the trap-forming hologram that arranged the spheres 70. The very good agreement between the optical traps' design and features in the resulting reconstructed field attests to the accuracy of both the projection and imaging methods.

Figure 3F:
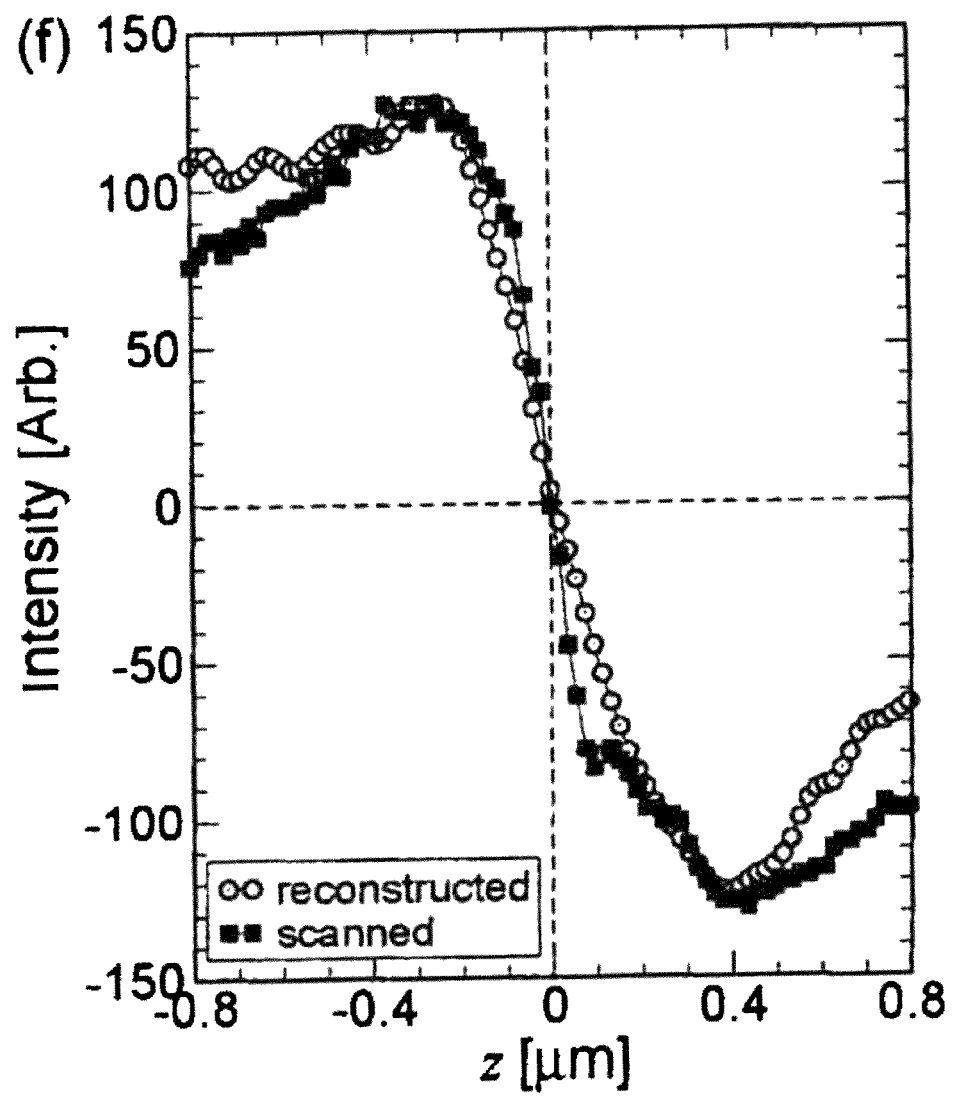
FIG. 3F illustrates axial intensity profiles from FIGS. 3B and 3D, demonstrating accuracy of the axial reconstruction.

Contrary to previous reports in the prior art, images such as those in FIGS. 3A to 3F suggest that the axial resolution of our holographic reconstruction approaches the diffraction-limited in-plane resolution. FIG. 3A shows a hologram obtained for one of the spheres 70 held by an optical tweezer at height z=17 μm above the focal plane. FIG. 3B is an axial section through the real part of field reconstructed from $\Re\{v(r,z)\}=|v(r,z)|\cos(\phi(r,z))$. This representation has the benefit of most closely resembling the scattering field observed in conventional three-dimensional bright-field microscopy. The sphere, in this case, is centered at the cusp between bright and dark regions. This crossover in the scattered field's sign creates a dark dimple in the intensity.

The effective axial resolution can be assessed by scanning the sphere past the focal plane and stacking the resulting images to create a volumetric data set. FIG. 3C is a hologram of the same sphere from FIG. 3A at z=0. Compiling a sequence of such images in axial steps of $\Delta_z=0.122$ μm yields the axial section in FIG. 3D.

Structure in the spheres' images along the axial direction can be analyzed to track the spheres 70 in z, as well as in x and y. For the micrometer-scale particles or the spheres 70 studied here, for example, the centroid is located in the null plane between the downstream intensity maximum and the upstream intensity minimum along the scattering pattern's axis. Holographic microscopy of colloidal particles therefore can be used to extract three-dimensional trajectories more accurately than is possible with conventional two-dimensional imaging and far more rapidly than with scanned three-dimensional imaging techniques. In particular, in-plane tracking can make use of conventional techniques, and tracking in depth requires additional computation but no additional calibration.

Analyzing images becomes far more challenging when objects occlude each other along the optical axis, as FIGS. 4A and 4B demonstrate. Here, the same pattern of the spheres 70 from FIGS. 2A-2E has been rotated by 90°, so that four of the spheres 70 are aligned along the optical axis 80. FIG. 4A is a detail from the resulting hologram and FIG. 4B is the holographic reconstruction in the vertical plane of the structure. The central observation from FIG. 4B is that all four of the spheres 70 are resolved, even though they directly occlude each other. A fifth sphere 70, not directly occluded by the others was included as a reference, and is visible to the right of the others in FIGS. 4A and 4B.

The uppermost spheres 70 in FIG. 4B appear substantially dimmer than those trapped closer to the focal plane; and FIGS. 4A and 4B compensate for this by presenting the amplitude $|v(r,z)|$, rather than the intensity, of the light field. The reference sphere 70, however, is no brighter than its occluded neighbor, and no dimmer than any of the spheres 70 in FIGS. 2A-2E. Rather, the lower spheres 70 act as lenses, gathering light scattered from above and focusing it onto the optical axis 80. As a result, these spheres 70 appear substantially brighter than normal, and their images are distorted. Equation (9) does not take such multiple light scattering into account when reconstructing the light field.

The resulting uncertainty in interpreting such results can be mitigated by acquiring images from multiple focal planes, or by illuminating the sample under investigation from multiple angles, rather than directly in-line. Results also would be improved by more accurate recordings. Each pixel in our holographic images contains roughly six bits of usable information, and no effort was made to linearize the camera's response. The camera 60 was set to $\frac{1}{2000}$ s shutter speed, which nonetheless allows for some particle motion during each exposure. A wider dynamic range, calibrated intensity response and faster shutter all would provide sharper, more accurate holograms, and thus clearer three-dimensional reconstructions.

With these caveats, the image in FIG. 4B highlights the potential importance of holographic imaging for three-dimensional holographic manipulation. The most distant particle 70 appears displaced along the optical axis relative to the reference particle even though both were localized in optical tweezers projected to the same height. Three-dimensional visualizations confirm the structure of the projected trapping field. The apparent axial displacement was not evident for inclinations less than roughly 80°. It therefore reflects either a three-dimensional imaging artifact or, more likely, a real displacement of the particles 70 from their designed configuration. This is reasonable because light from the traps projected closer to the focal plane exerts forces on particles trapped deeper into the sample. This effect is exacerbated by particles trapped closer to the focal plane, which deflect light onto more distant particles, altering their effective potential energy wells. This effect has been exploited for in-line optical binding of particles trapped along thread-like Bessel beams. Holographic imaging provides a means for measuring such distortions, and thus a basis for correcting them. This can be critically important for processes such as the holographic assembly of photonic heterostructures which rely on accurate placement of microscope such particles or other objects.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of performing 3-D holographic microscopy of an optically trapped structure, comprising the steps of:
    providing an optical microscope having a focal plane;
    generating a laser beam having an associated imaging wavelength input to the optical microscope wherein imaging of the optically trapped structure arises from the laser beam with the associated imaging wavelength;

generating from the laser beam a plurality of optical traps with wave fronts of a trapping laser beam having a phase only hologram encoding an optical trapping pattern and the trapping laser beam having an associated trapping wavelength; and providing an objective lens for the optical microscope, the objective lens both projecting the plurality of optical traps and collecting in-line holographic images of the trapped structure; and providing volumetric images of the trapped structure from the laser beam to a device for providing 3-D holographic microscopy of the trapped structure.

2. The method as defined in claim 1 further including the step of interposing a dichroic mirror between the objective lens and the device, the dichroic mirror tuned to the trapping laser beam's trapping wavelength.

3. The method as defined in claim 1 wherein the images include ghosting which can be minimized by translating the trapped structure from the focal plane.

4. The method as defined in claim 1 wherein the method involves no mechanical motion for performing three-dimensional holographic microscopy of the trapped structure.

5. The method as defined in claim 1 further including the step of subtracting off a reference image from the image formed at the device, thereby removing a varying background illumination when none of the trapped structure is present.

6. The method as defined in claim 1 wherein the images of the trapped structure include two-dimensional real-valued images for reconstruction of a three-dimensional complex-valued light field.

7. The method as described in claim 1 further including the step of reconstructing a 3-D complex light field v(r,z) of the images by solving, $$v(r, z) \equiv |v(r, z)|\exp(i\phi(r, z))$$
$$= \frac{1}{4\pi^2} \int_{-\infty}^{\infty} B(q) H_{-z}(q) \exp(iq \cdot r) d^2 q$$

where |v(r,z)| is an absolute value of v(r,z), $\phi$ is a conventional phase angle of exponential, exp, and $B(q)H_{-z}(q)$ is a Rayleigh Summerfield propagator.

8. The method as defined in claim 7 wherein the light field v(r,z) is reconstructed from a single holographic snapshot of the image.

9. The method as defined in claim 8 further including the step of tracking movement of the trapped structure.

10. The method as defined in claim 8 wherein the trapped structure comprises a plurality of objects which are occluded and the three-dimensional images are reconstructed and the objects all resolved in the reconstructed light field.

11. The method as defined in claim 1 further including the step of acquiring image data from multiple focal planes of the optical microscope, thereby enhancing accuracy of the images of the trapped structure.

12. A method of performing 3-D holographic microscopy of an object of an optically trapped structure, comprising the steps of:

providing an optical microscope having a focal plane;

generating a laser beam having an associated imaging wavelength input to the optical microscope wherein the imaging beam is provided by a laser having a beam output;

providing an objective lens for the optical microscope, the objective lens at least collecting in-line holographic images of the object of the trapped structure;

providing images of the object of the trapped structure to a device for viewing three-dimensional holographic microscopy; and analyzing the images using a Rayleigh-Sommerfeld formalism by analyzing propagation of the trapped structure along an optical axis of the optical microscope.

13. The method as defined in claim 12 wherein the trapped structure gives rise to a scattered field u(r,z) at a distance z upstream of a focal plane of the optical microscope and the scattered field u(r,z) is reconstructed by $$b(r) = \frac{I_0(r) - |a(r)|^2}{|a(r)|} \approx 2 \frac{\Re\{a * (u \otimes h_z)\}}{|a(r)|}$$
$$\approx 2\Re\{u \otimes h_z\}$$

where b(r) is the reconstruction field parameter for obtaining u(r,z), $I_o(r)$ is incident light intensity as a function of radial distance, r, from an object at height $h_z$, with z an axis extending above the focal plane, a (r) is a reference field as a function of r, and $\Re$ is a real component mathematical operator and $\otimes$ is a well known conventional mathematical vector cross operator.

14. A system for performing three-dimensional holographic microscopy of an optically trapped structure, comprising:

an optical microscope;

a laser source for producing a trapping laser beam for a structure;

a spatial light modulator for providing a phase-only hologram for imprinting on the trapping laser beam;

the laser source also for producing an imaging laser beam and using the imaging laser beam providing volumetric three-dimensional images of the optically trapped structure;

an objective lens associated with the optical microscope;

a device for detecting laser light arising from imaging of the trapped structure and the device outputting image data; and a computer for analyzing the image data using computer software executed by the computer.

15. The system as defined in claim 14 further including a dichroic mirror disposed between the objective lens and the device for detecting laser light.

16. The system as defined in claim 14 wherein the computer software comprises mathematical formalisms including Rayleigh-Sommerfeld determinations of light field v(r,z) for the laser beam received by the device.

17. The system as defined in claim 14 wherein the Rayleigh-Sommerfeld determinations comprise embedded computer software executed by the computer to calculate, $$v(r, z) \equiv |v(r, z)|\exp(i\phi(r, z))$$
$$= \frac{1}{4\pi^2} \int_{-\infty}^{\infty} B(q) H_{-z}(q) \exp(iq \cdot r) d^2 q$$

18. A system for performing three-dimensional holographic microscopy of an object of a structure, comprising:

an optical microscope;

a laser source for producing a collimated beam of coherent light for providing an imaging laser beam and selectively providing a trapping laser beam;

a spatial light modulator for providing a phase-only hologram for imprinting on the trapping laser beam;

an objective lens associated with the optical microscope for operating on the imaging laser beam and as needed selectively operating on the trapping laser beam;

a device for detecting laser light arising from imaging of at least one of the object of the structure and selectively trapped features of the structure and the device outputting image data; and a computer for analyzing the image data using computer software executed by the computer.

19. The system as defined in claim 18 wherein the computer software comprises mathematical formalisms including Rayleigh-Sommerfeld determinations of light field v(r,z) for the laser beam received by the device.

20. The system as defined in claim 18 wherein the Rayleigh-Sommerfeld determinations comprise embedded computer software executed by the computer to calculated, $$v(r, z) \equiv |v(r, z)| \exp(i\phi(r, z)) = \frac{1}{4\pi^2} \int_{-\infty}^{\infty} B(q) H_{-z}(q) \exp(iq \cdot r) d^2 q.$$

21. The system as defined in claim 18 further including a dichroic mirror disposed between the objective lens and the device for detecting laser light.

* * * * *